United States Patent [19]

Kristiansen

[11] 4,346,948

[45] Aug. 31, 1982

[54] THRUST BEARING DEVICE, PARTICULARLY FOR TAKING UP OSCILLATING ROTATIONAL MOVEMENTS

[75] Inventor: Svend H. Kristiansen, Naestved, Denmark

[73] Assignee: Nordisk Ventilator Co., A/S, Naestved, Denmark

[21] Appl. No.: 205,369

[22] PCT Filed: Jan. 9, 1980

[86] PCT No.: PCT/DK80/00003
§ 371 Date: Sep. 19, 1980
§ 102(e) Date: Sep. 12, 1980

[87] PCT Pub. No.: WO80/01503
PCT Pub. Date: Jul. 24, 1980

[30] Foreign Application Priority Data

Jan. 19, 1979 [DK] Denmark .............................. 251/79

[51] Int. Cl.³ .................... F16C 19/10; F16C 19/50
[52] U.S. Cl. .................................... 308/219; 308/227; 308/233
[58] Field of Search .............. 308/219, 227, 229, 230, 308/231, 232, 233, 234

[56] References Cited

U.S. PATENT DOCUMENTS

| | | | |
|---|---|---|---|
| 2,451,658 | 10/1948 | Bugatti | 308/233 |
| 2,453,291 | 11/1948 | Wilford | 308/227 |
| 2,647,807 | 8/1953 | Brunstrum | 308/230 |
| 3,258,301 | 6/1966 | Porvatov | 308/227 |

FOREIGN PATENT DOCUMENTS

| | | | |
|---|---|---|---|
| 402575 | 9/1924 | Fed. Rep. of Germany | 308/230 |
| 743916 | 4/1933 | France | 308/219 |
| 41531 | 1/1914 | Sweden | 308/227 |
| 81553 | 9/1934 | Sweden | 308/219 |

Primary Examiner—Richard R. Stearns
Attorney, Agent, or Firm—Sughrue, Mion, Zinn, Macpeak & Seas

[57] ABSTRACT

A thrust being assembly in which two coupled coaxial thrust bearings are restricted by means of a blocking device to be allowed to turn in one direction of revolution only, so that rolling elements of each bearing in response to oscillating movement of the bearing assembly will be displaced to a new point of contact with the associated bearing race. The blocking device may comprise two oppositely oriented coaxial helical springs frictionally engaging an intermediate race ring of the bearing assembly.

11 Claims, 10 Drawing Figures

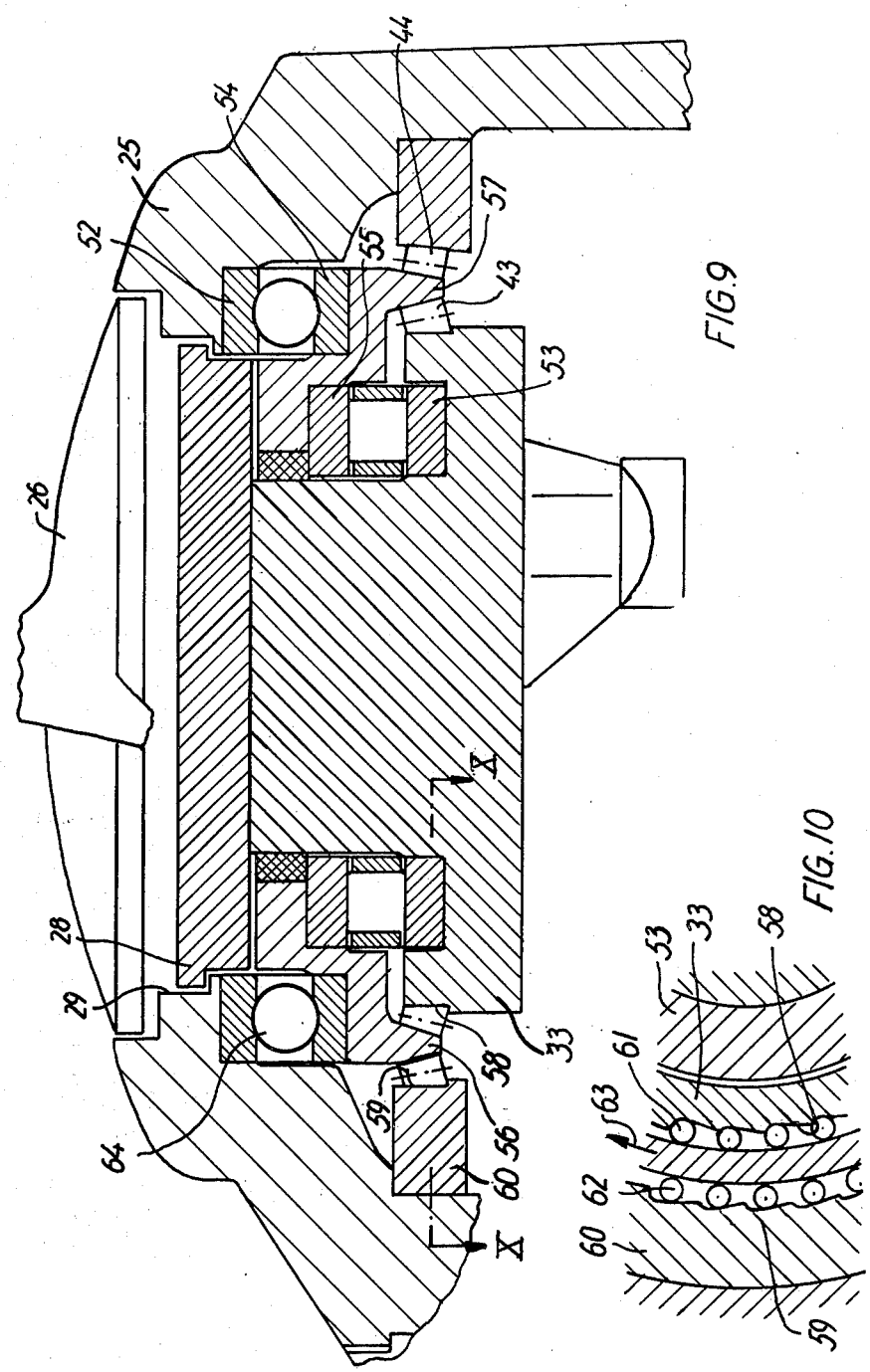

THRUST BEARING DEVICE, PARTICULARLY FOR TAKING UP OSCILLATING ROTATIONAL MOVEMENTS

TECHNICAL FIELD

The invention relates to a thrust bearing device, particularly for taking up oscillating rotational movements of two relatively movable coaxial roller races positioned in parallel planes and axially loaded relative to each other.

BACKGROUND ART

Thrust bearing devices of this kind, which are not only exposed to a considerable axial load, but in which only small oscillating rotational movements of one race relative to the other occur in a considerable part of the operational life, are used, for example, as blade suspension bearings for axial flow fans having blades which are adjustable during operation. Usually, the adjustable blades are retained in the wheel rim of the fan wheel by a suspension arrangement, in which a control arm connected with the blade foot and having also connection with a blade pitch adjusting mechanism, carries a flange which is connected with one race of the bearing, whereas the other race is secured relative to a surrounding bearing bore in the wheel rim.

During rotation of the fan, such blade suspension bearings are exposed to a very heavy axial pressure load from the centrifugal forces acting on the blade. Moreover, for a given blade pitch setting the rollers of the bearing will be in a nearly stationary condition relative to the races and only perform a small rocking or oscillating rolling movement around a position of equilibrium in synchronism with control pulses supplied to the blade adjusting mechanism. As a result of these two phenomena taken together, bearings of this kind are to a particular extent subjected to wear, which often results in deterioration of the races due to a phenomenon of surface impression fatigue, also known under the term "brinelling", whereby the rollers may be blocked relative to the races, so that the relative movability thereof is reduced or even completely prevented, and adjustment of the blade pitch is considerably restricted or completely blocked.

In spite of continuous efforts to remedy these problems for blade suspension bearings through improved bearing design and surface treatment of rollers and races, bearings of the kind referred to will, in practice, often suffer from the above mentioned disadvantages.

Similar problems occur in axial thrust bearings of the kind used in the front wheel suspension arrangement of vehicles, such as automobiles for transferring the weight of the vehicle to the rotatably suspended front wheels. Also in such bearings, a risk of brinelling occurs as a result of the fact that only part of the races of the bearing is utilized.

In this field, it has been suggested in the specification of U.S. Pat. No. 2,453,291 to remove the disadvantages mentioned by means of a thrust bearing device of the kind mentioned having two relatively movable coaxial roller races positioned in parallel planes and axially loaded relative to each other, said races constituting one of the races of each of two coaxial thrust bearings coupled in series with respect to their loading forces, in which bearings the two opposite races are immovable relative to each other and are prevented by a blocking device from rotating in one and the other direction of revolution, respectively, relative to one and the other of said relatively movable races.

In this prior art bearing design, the two series-arranged bearings will be alternatively active for one and the other direction of revolution. When one of the relatively movable races belonging to each of the two bearings is performing a rotational movement, whereas the other is retained against rotation, the opposite relatively immovable races belonging to each of the bearings will by movement in one direction of revolution take part in this rotational movement, whereas by movement in the other direction of revolution they will be retained against rotation. As a result thereof, each roller in each bearing will, in principle, by each rotational movement performed by the bearing in question be displaced to local engagement with another part of contact on the races in question.

Moreover, the design with two bearings coupled in series with respect to their loading forces results in a distribution of wear. Both the continuous displacement of the rollers relative to the races and this distribution of the wearing load contribute to a reduction of the risk of brinelling and thereby to an increase of the life time.

In the above mentioned prior art design, the blocking device comprises two ratched teeth mechanisms belonging to each of the bearings and each comprising two rims each connected with one of the race rings of the bearing, said rims being formed with ratched teeth facing and mutually engaging each other and designed such that the teeth are oppositely directed in the two ratched teeth mechanisms, which are coupled together by provision of the relatively immovable races on a common intermediate race ring for the two bearings.

In addition to the complicated construction, which makes the bearing device considerably more expensive, the above mentioned design of the blocking device in the known bearing construction will only be able to fulfil the object aimed at, i.e. secure a continuous displacement of the rollers relative to the races, for rotational movements beyond a certain magnitude corresponding to the tooth spacing of the ratched teeth rims. In view thereof and of the fact that in case of a great axial load, a considerable resistance must be overcome for each rotational movement due to the engagement of said ratched teeth, the prior art construction referred to will not be suitable for taking up small oscillating rotational movements of the kind occurring, inter alia, in blade suspension bearings as mentioned hereinbefore, which are exposed to a very heavy axial load from centrifugal forces. With the described design of the blocking device in the known bearing construction, such small movements will not give rise to any displacement of the rollers, because they are typically smaller than the minimum movement determined by the tooth spacing of the ratched teeth.

SUMMARY OF THE INVENTION

Without being limited thereto, it is a particular object of the invention to remedy the disadvantages described also for such bearings which as mentioned above are typically exposed to small oscillating rotational movements, so that a continuous displacement of the rollers relative to the races is secured for arbitrarily small movements.

Taking as a starting point the design known from the specification of the above mentioned U.S. patent, a thrust bearing device according to the invention is characterized in that said blocking device is constructed to allow substantially stepless relative rotational movement between said relatively immovable races and one or the other of said relatively movable races without any axial displacement of any part of the bearing device.

In a preferred embodiment of the thrust bearing device according to the invention, the blocking device is constituted by a spring coupling comprising two helical springs, each of which is arranged for spring action against two race rings belonging to the same bearing, each of said springs terminating freely at least in one end.

Thus, in this embodiment the blocking mechanism is based on substantially the same principle as a free wheel mechanism. For each of the two directions of revolution, the engagement between one helical spring and one or both of the race rings influenced thereby will be loosened, so that the two races for the bearing in question may move relative to each other, whereas the engagement between the other helical spring and both of the race rings influenced thereby will be tightened to prevent rotational movement of the two race rings of the other bearing relative to each other.

In an embodiment, in which the race rings have the same diameter for the two bearings, such as known in itself from the specification of the above mentioned U.S. patent, both of said helical springs may be arranged on the same side of the race rings seen in the radial direction and with opposite helix directions relative to one another.

If, due to considerations with respect to demands of space, the thrust bearing device is desired to be constructed with a smaller height than obtainable with two series-coupled bearings having the same diameter, which may be desirable in case of blade suspension bearings, for example, the two bearings may have different diameters and partly overlap each other in the axial direction.

If, in connection therewith, the above mentioned design of the blocking device as a spring coupling is used, it is advantageous if one helical spring is arranged inside the two race rings belonging to one bearing, whereas the other helical spring is arranged outside the two race rings belonging to the other bearing, the two helical springs having the same helix direction. However, this different arrangement of the helical springs may also be used in case of two bearings having the same diameter.

In the above mentioned design comprising two bearings having different diameters, the blocking device may, instead of by means of a spring coupling, be obtained in that the race rings for the relatively immovable races are coupled through a coupling member, which is restricted to rotation in a prescribed direction of revolution relative to each of said relatively movable races. Such a coupling member may be coupled with one or the other of said relatively movable races in each bearing through a roller clutch.

BRIEF DESCRIPTION OF DRAWINGS

In the following, the invention will be explained in further detail with reference to the schematical drawings, in which

FIG. 9 is a sectional view corresponding to FIGS. 6 to 8, in which an alternative embodiment of the thrust bearing device according to the invention is used as blade suspension bearing; and FIG. 10 is a partial sectional view along the lines X—X in FIG. 9.

DETAILED DESCRIPTION

Figure 1:
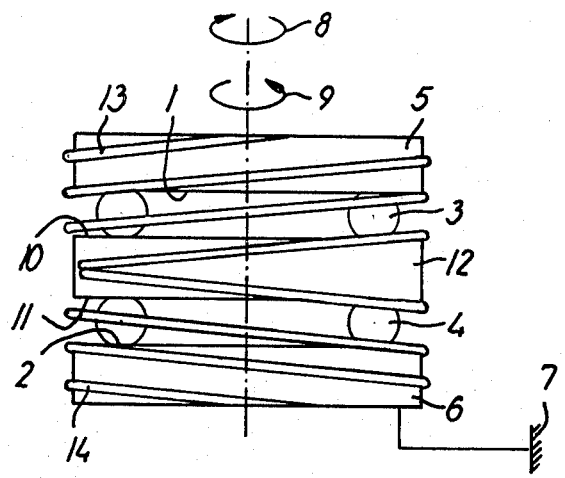
FIG. 1 illustrates the principles of a thrust bearing device according to the invention by means of a first embodiment thereof.

In the schematic illustration in FIG. 1, the relatively movable races of the thrust bearing devices are shown at 1 and 2. As shown, each of these races constitutes one race of each of two coaxial thrust bearings, which are series-coupled with respect to their loading forces, said bearings being shown in the figure with rollers in the form of balls at 3 and 4, respectively. The relatively movable races 1 and 2 are constituted in the figure by the surfaces facing each other and positioned in radial planes of two race rings 5 and 6, respectively, having the same diameter, one of said race rings 6 being retained against rotation as symbolically indicated at 7, whereas the other race ring 5 as indicated by arrows 8 and 9 may perform an oscillating rotational movement.

The opposed races 10 and 11, respectively, relative to the races 1 and 2, of each of the two series-coupled bearings are relatively immovable and may, as shown, be constituted by the opposite radial surfaces of a common intermediate race ring 12.

As a blocking device, which in accordance with the invention shall prevent the relatively immovable races 10 and 11 from rotating in one and the other of the directions of revolution shown by the arrows 8 and 9, respectively, relative to one and the other of the relatively movable races 1 and 2, respectively, there is shown schematically in FIG. 1 a spring coupling comprising two helical springs 13 and 14 arranged without any firm connection on the intermediate ring 12 with the relatively immovable races and each of the race rings 5 and 6 with opposite helix directions so as to terminate freely in both ends.

The blocking device illustrated functions in such a way that by rotational movement of the race ring 5 in the direction shown by the arrow 8, the engagement between the helical spring 13 and the race ring 5 or the intermediate ring 12 will be loosened, so that the race 1 is allowed to turn in this direction relative to the race 10. On the other hand, no rotation of the race 11 in the direction shown by the arrow 8 relative to the race 2 will be allowed, since such rotational movement will be prevented as a result of the fact that the engagement between the helical spring 14 and the intermediate ring 12 and the race ring 6 will be tightened.

In case of rotational movement of the race ring 5 in the direction shown by the arrow 9, however, the engagement between the helical spring 13, and the race ring 5 and the intermediate ring 12 will be tightened, so that the race ring 5 and, thereby, the race 1 will not be allowed to turn in this direction relative to the race 10. Therefore, by this rotational movement of the race ring 5, the intermediate ring 12 will be carried along and also turned in the direction shown by the arrow 9. Thereby, the engagement between the helical spring 14 and the intermediate ring 12 or the race ring 6 will be loosened, so as to allow the race 11 to turn in the direction shown by the arrow 9 relative to the race 2.

By use of a thrust bearing device of the construction shown as a blade suspension bearing in an axial flow fan, the race ring 5 with the race 1 will be connected with the blade, whereas the race ring 6 with the race 2 will be retained relative to a bearing bore in the wheel rim of the fan wheel. During rotation of the fan with a given blade pitch setting, the pulses supplied to the usually servo-controlled blade pitch adjusting mechanism may cause small oscillating rotational movements of the fan blades, and this oscillating movement of each blade will be transferred to the race 1 of the thrust bearing device connected with the blade. Since the race 1 is only allowed to turn in the direction shown by the arrow 8 relative to the race 10, whereas the race 11 is only allowed to turn in the direction shown by the arrow 9 relative to the race 2, the rollers 3 and 4 in the two series-coupled bearings will be alternatively active for one and the other direction of revolution in this oscillating movement, and for each rotational movement in each of the two bearings, the rollers will be displaced to local engagement with new points of contact on each of the races in question, whereby the risk for blocking relative to the races as a result of brinelling is substantially avoided.

Figure 2:
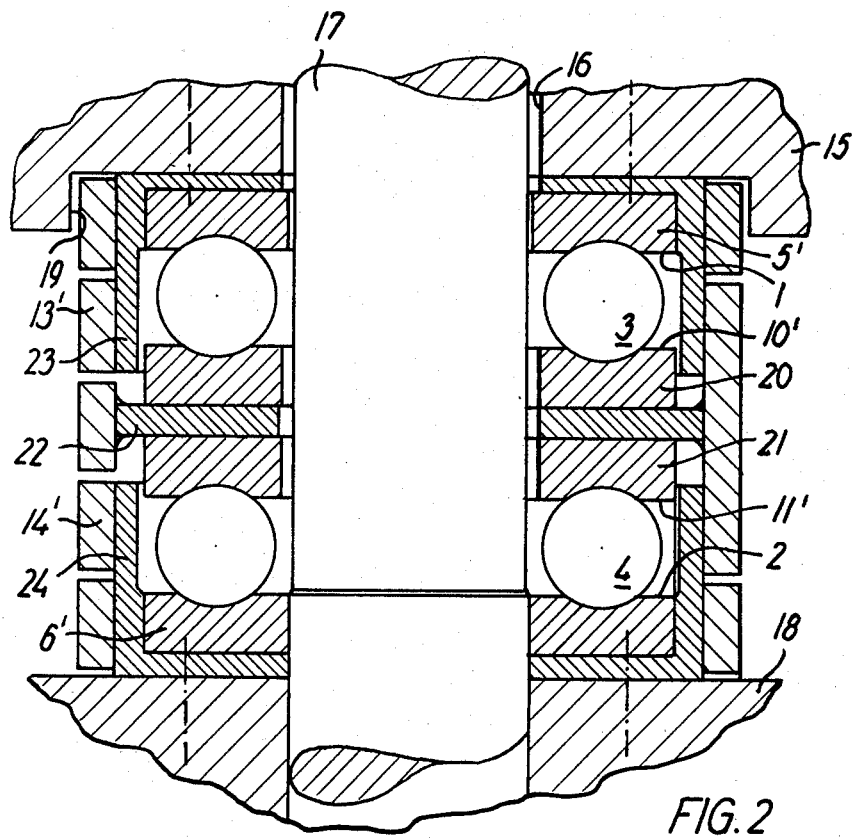
FIGS. 2 and 3 are an axial sectional view and a side view, respectively, of a design example of the embodiment shown in FIG. 1.
Figure 3:
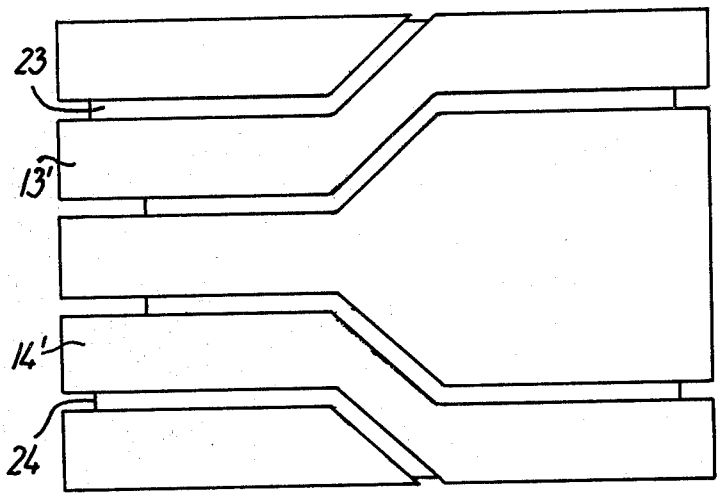

FIGS. 2 and 3 are an axial sectional view and a side view, respectively, of a possible practical embodiment of a thrust bearing device of the embodiment illustrated in principle in FIG. 1. Since the structural arrangement is, in principle, the same as in FIG. 1, elements corresponding to those shown in FIG. 1 have been designated by the same references. In addition thereto, parts of a wheel rim for a fan wheel is shown at 15, in which a bore 16 is formed for a blade shaft 17 connected with a control arm, not shown, which is connected with a blade pitch adjusting mechanism of a design known per se. On the blade shaft 17 a flange 18 is secured, and the thrust bearing device is arranged between the surfaces facing each other of this flange 18 and the bottom of a cut-out 19 at the internal side of the wheel rim 15 around the bore 16.

Contrary to the principal arrangement illustrated in FIG. 1, the relatively immovable races 10' and 11' in each of the two series-coupled bearings in FIG. 2 are formed on each of two separate race rings 20 and 21, respectively, arranged on opposite sides of an intermediate ring 22, which is connected with two helical springs 13' and 14' constituting together the spring coupling acting as a blocking device. In the embodiment shown, these helical springs do not directly engage each of the two relatively movable race rings 5' and 6', but enclose each of two bearing casings 23 and 24, which are firmly connected with the race ring 5' and the wheel rim 15 and with the race ring 6' and the flange 18 secured on the blade shaft, respectively.

FIG. 3 is an external view of the thrust bearing device in FIG. 2. The two helical springs 13' and 14' enclosing each of the bearing casings 23 and 24 may, as shown, be formed integrally from strip-shaped material, such as steel plate, by stamping and subsequent rolling and hardening, whereby to obtain in addition a favourable closing of the bearing device against dust and dirt. By this design, the individual spring windings will, on the major part of their periferal length be parallel to a radial plane, subsequent spring windings being connected by oblique intermediate pieces. In the figure, helical springs 13' and 14' are shown, each having two windings, but of course nothing would prevent use of helical springs with a greater number of windings suitable for the axial dimension of the thrust bearing device.

Figure 4:
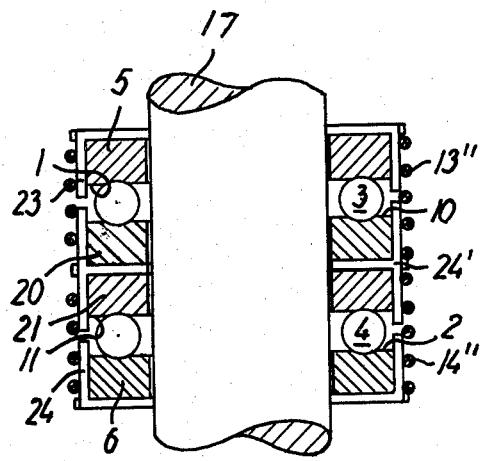
FIGS. 4 and 5 are an axial sectional view and a side view, respectively, of a particularly simple and cheap embodiment by modification of the construction example shown in FIGS. 2 and 3.
Figure 5:
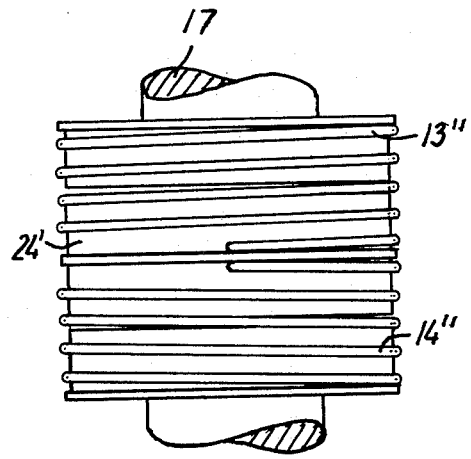

However, a particularly simple and cheap embodiment is obtained, if instead of the special springs shown in FIG. 3, standard helical springs 13" and 14" of flat or round spring wire having elliptical or circular cross-section are used, as shown in FIGS. 4 and 5, and arranged without any firm connection, whereby the two race rings 20 and 21 may be secured in a common bearing casing 24', enclosed by both helical springs 13" and 14".

In FIGS. 6 to 9, various embodiments of the thrust bearing device according to the invention are illustrated in use as a blade suspension bearing in the fan wheel of an axial flow fan, the wheel rim thereof being shown at 25, whereas 26 designates a fan blade which in a manner not illustrated is firmly connected with a blade flange 27 positioned in a cut-out 28 at the external side of the wheel rim 25. In a manner not illustrated, a flange portion 29 of a control member for adjusting the blade pitch is secured to the blade flange 27. In this case, contrary to the embodiment illustrated in FIGS. 4 and 5, no blade shaft is connected with the fan blade 26.

Figure 6:
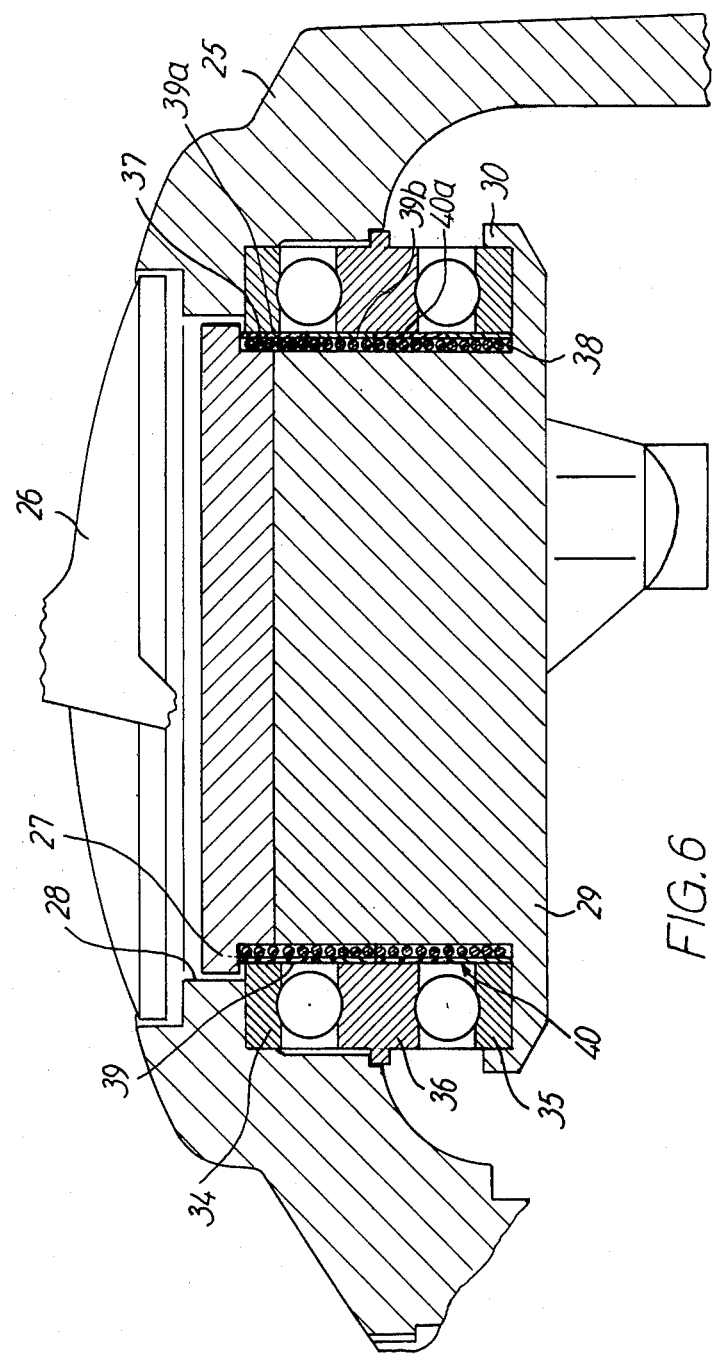
FIGS. 6 and 7 are sectional views in an axial plane of the wheel rim for an axial flow fan, in which modifications of the embodiment shown in FIGS. 4 and 5 are used as blade suspension bearings.
Figure 7:
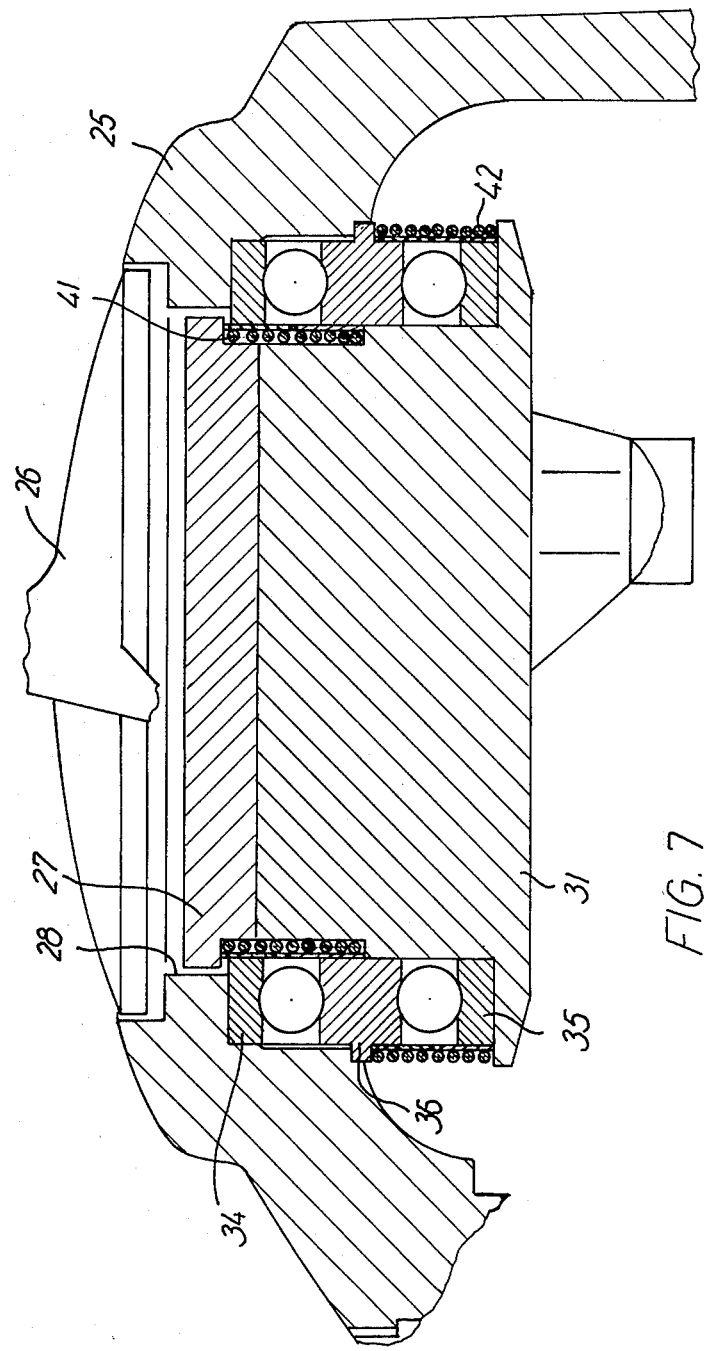

In the embodiment shown in FIGS. 6 and 7, modifications of the embodiment shown in FIGS. 4 and 5 have been used as a blade suspension bearing, the thrust bearing device comprising two coaxial bearings having the same diameter, which are series-coupled with respect to their loading forces. In FIG. 6, the mutually movable races of the bearing device are constituted by the radial faces facing each other of two race rings 34 and 35, one of which is firmly connected with the wheel rim 25, whereas the other is connected with the flange portion 29. The relatively immovable races are formed by opposite radial surfaces on an intermediate race ring 36 common to the two bearings. In the same manner as in the embodiment shown in FIGS. 4 and 5, the blocking device is constituted by a spring coupling comprising two helical springs, which are designated by 37 and 38 in FIG. 6, but are arranged, in this case, on the internal side of the race rings 34, 36 and 36, 35, respectively, whereby a bushing 39 and 40, respectively, has been interposed between each of the helical springs 37 and 38 and each of the race rings 34, 36 and 36, 35, respectively, covered thereby, said bushings being slit in a manner not illustrated in the axial direction of the bearing for transferring the spring pressure from the helical springs 37 and 38 to the race rings. As shown in the figure at 39a, 39b and 40a, 40b, two axially aligned bushings must be used for each bearing for obtaining an independent tightening function around the movable race ring 34 and 35, respectively, and the immovable race ring 36 of the bearing in question.

Since the helical springs 37 and 38 are arranged with different helix directions in the same manner as in the embodiments shown in FIGS. 3 to 5, the embodiment shown in FIG. 6 will function, in principle, in the same manner as described in the foregoing for the embodiment in FIG. 3, bearing in mind only that in case of internally arranged helical springs 37 and 38, the engagement between each of such springs and the corresponding race rings will be tightened or loosened, respectively, when the rotational movement takes place in the opposite direction and the same direction, respectively, relative to the helix direction of the helical spring.

In the embodiment shown in FIG. 7, in which parts corresponding to those shown in FIG. 6 are designated by the same references, the blocking device is designed in the same manner with two helical springs, of which, however, one 41 is arranged on the internal side of the race rings 34 and 36, whereas the other 42 is arranged on the external side of the race rings 36 and 35. In this case, contrary to the embodiments shown in FIGS. 3 to 6, the two helical springs 41 and 42 should be arranged with the same helix direction.

For blade suspensions of the kind shown in FIGS. 6 and 7, the simplest design will be obtained with the embodiment shown in FIG. 6, in which helical springs having a somewhat smaller diameter may be used. On the other hand, in the embodiment shown in FIG. 7, an improved engagement of the lower race ring 35 of the relatively movable race rings relative to the flange portion, here designated by 31, of the control member will be obtained without any requirement of a raised rim portion 30 on the flange portion as engagement for the race ring 35, such as shown in FIG. 6.

Figure 8:
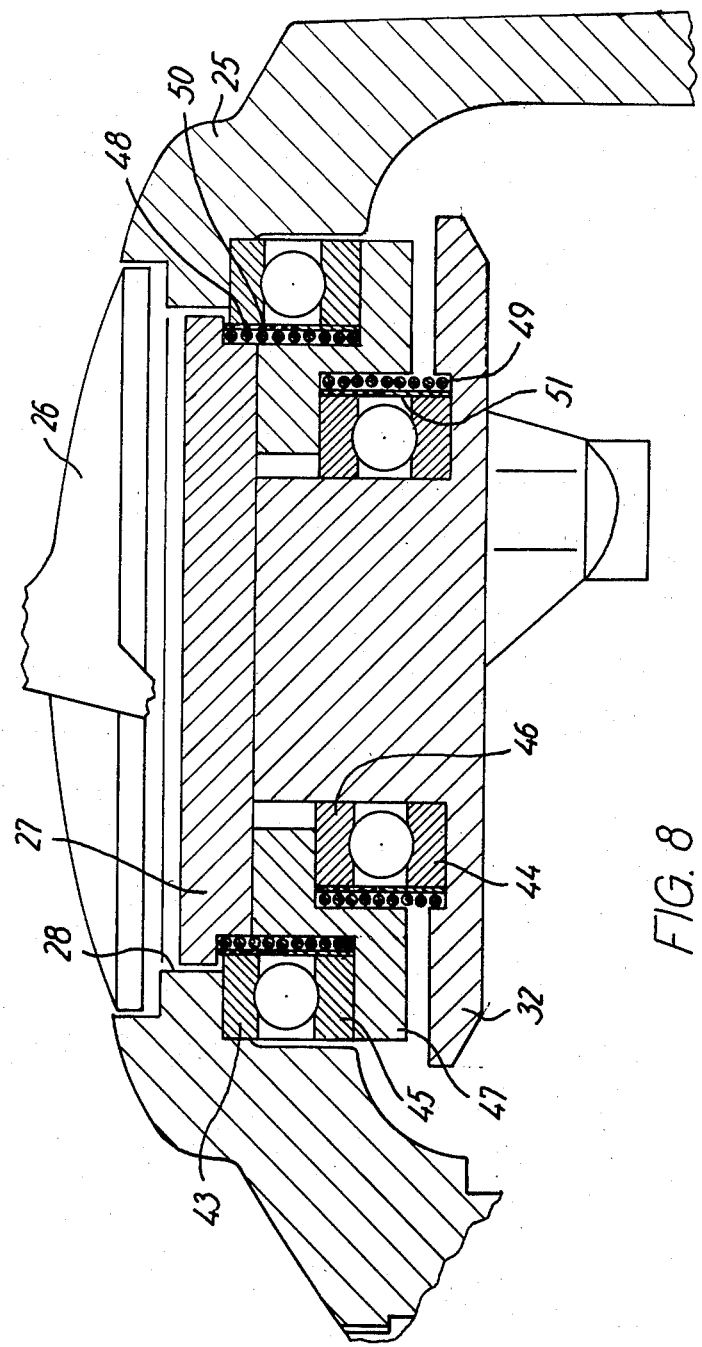
FIG. 8 shows a modification of the embodiment in FIG. 7.

Whereas the embodiment of the thrust bearing device described in the foregoing will have a relatively great dimension in the axial direction due to the use of two bearings having the same diameter, which may be undesired in applications, in which only limited space will be available for the bearing, such as may be the case for blade suspensions of the kind shown in FIGS. 6 and 7, FIG. 8 shows an embodiment, in which a somewhat smaller height and thereby a smaller demand of space in the axial direction has been obtained by using two coaxial bearings having different diameters, said bearings being series-coupled with respect to their loading forces. In this case, the relatively movable races are formed on the radial surfaces facing each other of a race ring 43 firmly connected with the wheel rim 25, and a race ring 44 secured in the flange portion designated in this embodiment by 32. In the two bearings, the relatively immovable races are formed on the radial surfaces of two separate race rings 45 and 46, respectively, facing the race rings 43 and 44, said separate race rings being mutually connected and, thereby, prevented from relative movement in this case by means of a separate intermediate member 47, since they must be movable relative to the wheel rim 25 as well as the flange portion 32. In this case, the spring coupling acting as a blocking device is constructed in the same way as in the embodiment shown in FIG. 7 with two helical springs, one of which 48 is arranged on the internal side of the race rings 43 and 45 in engagement with axial slit bushings 50, whereas the other helical spring 49 is arranged on the external side of the race rings 46 and 44 in engagement with axial slit bushings 51.

For use in blade suspensions of the kind shown in FIGS. 6 to 8, FIG. 9 shows an alternative embodiment of the thrust bearing device employing two series-coupled bearings having different diameters. The race rings firmly connected with the wheel rim 25 and the flange portion designated in this case by 33, respectively, are designated by 52 and 53, respectively, whereas the relatively immovable races in the same manner as in the embodiment shown in FIG. 8 are formed by radial faces on two separate race rings 54 and 55, respectively. In the same manner as in the embodiment shown in FIG. 8, the difference between the bearing diameters in such that the race ring 54 for the bearing connected with the wheel rim 25 completely encircles the race ring 55 for the bearing connected with the flange portion 33 in substantially the same radial plane.

In the embodiment shown in FIG. 9, the blocking device functioning to prevent the relatively immovable races defined by the race rings 54 and 55 for each of the two bearings from rotating in one and the other direction of revolution, respectively, relative to the opposed race 52 and 53, respectively, is constituted by a coupling member 56 firmly connected with the race rings 54 and 55, said coupling member being restricted to turn in a prescribed direction of revolution only, relative to the race rings 52 and 53, since it is positioned radially between the two race rings in the same manner as the intermediate member 47 shown in FIG. 8. In the embodiment shown in FIG. 9, this is obtained in that the coupling member 56 may be coupled to the wheel rim 25 and the flange portion 33, respectively, and thereby to the race rings 52 and 53, respectively, through a roller clutch. Between each side of a peripheral collar 57 having a wedge-shaped cross-section on the coupling member 56 and an opposed external set of protrusions 58 on the flange portion 33 and an opposed internal set of protrusions 59 on a ring 60 firmly connected with the wheel rim 25, respectively, two sets of conical rolls 61 and 62, respectively, are arranged so as to make up two roller clutches.

Thereby, as shown in FIG. 10, the coupling member 56 will be restricted to rotational movement in the direction of revolution shown by an arrow 63 only, relative to the ring 60 connected with the wheel rim 25 as well as the flange portion 33. By movement of the flange portion 33 connected with the blade 26 in the same direction as the arrow 63, the coupling member 56 will be carried along, whereby the race ring 54 will perform a rotational movement relative to the race ring 52. By rotational movement of the flange portion 33 in the opposite direction against the arrow 63, the flange portion 33 will, on the contrary, perform a rotational movement relative to the coupling member 56, whereas, on the other hand, the coupling member will be retained against rotation relative to the ring 60. Thereby, the race ring 53 will turn relative to the race ring 55.

As shown in FIG. 9, it is not necessary in a thrust bearing device according to the invention to use rollers of the same kind in the series-coupled bearings. For example, nothing could prevent the use of balls 64 in one bearing and cylindrical rollers 65 in the other bearing, or the use of any suitable form for rollers in each of the two bearings.

INDUSTRIAL APPLICABILITY

Even if the foregoing embodiments of the thrust bearing device according to the invention are mainly described with reference to their use as blade suspension bearing in axial flow fans, these bearing devices may also be used in other kinds of axially loaded thrust bearings in cases, in which a risk will otherwise prevail for deterioration of the races as a result of the fact that only a limited portion thereof is utilized in normal operation. As examples of such fields of application, reference could particularly be made to the thrust bearings mentioned in the foregoing used in the front wheel suspension of vehicles, such as automobiles, and thrust bearings of the kind utilized in the rudder suspension in ships, with the considerable advantage that continuous displacement of the rollers relative to the races takes place steplessly for any rotational movement and independent of the magnitude thereof.

I claim:

1. A thrust bearing device, particularly for taking up small oscillating rotational movements of two coaxial roller races extending in parallel planes to be relatively movable with respect to one another and being subjected to an axial loading force, comprising; first and second coaxial race rings forming said relatively movable roller races, intermediate roller races extending in parallel planes in an opposed relationship to each of said relatively movable races to provide two coaxial thrust bearings coupled in series with respect to said loading force, coupling means firmly connecting said intermediate races, a set of roller members arranged between each of said relatively movable races and the opposed intermediate race, and blocking means acting on said coupling means and each of said first and second race rings to prevent relative rotational movement between one of the relatively movable races and its opposed intermediate race for one direction of revolution and between the other of the relatively movable races and its opposed intermediate race for the other direction of revolution, said blocking means comprising clamping means arranged laterally with respect to said coupling means and each of said first and second race rings, respectively, to exert a pressure transverse to the common axis of said coaxial bearings and firmly clamp said coupling means with respect to said first race ring for said one direction of revolution and with respect to said second race ring for said other direction of revolution.

2. A thrust bearing device as in claim 1, wherein said coupling means comprises at least one intermediate race ring and said clamping means comprises two helical springs arranged for spring action against said intermediate race ring and said first and second race rings, each of said springs terminating freely at least in one end.

3. A thrust bearing device as in claim 2, wherein said first, second and intermediate race rings have the same diameter and said helical springs are arranged on the same side of said race rings seen in the radial direction and with opposite helix directions relative to one another.

4. A thrust bearing device as in claim 3, wherein the two helical springs are formed integrally from strip-shaped material.

5. A thrust bearing device as in claim 4, wherein said coupling means comprise two intermediate race rings each belonging to each of said bearings, said race rings being arranged on opposite sides of an intermediate ring which is connected with said integral helical springs.

6. A thrust bearing device as claimed in claim 1, wherein said first and second race rings have different diameters and said coupling means comprise two intermediate race rings of different diameters firmly connected by a coupling member in a laterally displaced relationship to partly overlap each other in the axial direction.

7. A thrust bearing device as in claims 2 or 6, wherein one helical spring is arranged inside said intermediate race ring and one of said first and second race rings and wherein the other helical spring is arranged outside the intermediate race ring and the other of said first and second race rings, the two helical springs having the same helix direction.

8. A thrust bearing device as in claim 2, wherein said helical springs are manufactured from spring wire engaging the race rings without any firm connection therewith.

9. A thrust bearing device as in claim 2, wherein an axial slit bushing is interposed between each helical spring and each of the race rings influenced thereby in engagement with said race ring.

10. A thrust bearing device as claimed in claim 9, wherein said bushing is divided into two parts in the axial direction.

11. A thrust bearing device as claimed in claim 1 wherein said coupling means comprises a coupling member, which is restricted to rotation in a prescribed direction of revolution relative to each of said relatively movable races, said coupling member coupled with one and the other of said first and second race rings through a roller clutch.

* * * * *